Feb. 18, 1969 D. W. BAXTER ET AL 3,428,953

CARD CAPACITOR STORAGE SELECTION SYSTEM

Filed July 14, 1965 Sheet 1 of 4

INVENTORS
DUANE W. BAXTER
BRUCE C. FELTON
HAROLD W. HILL
HARRY S. HOFFMAN, JR.
Joseph J. Connerton
ATTORNEY Feb. 18, 1969 D. W. BAXTER ET AL 3,428,953

CARD CAPACITOR STORAGE SELECTION SYSTEM

Filed July 14, 1965 Sheet 2 of 4

United States Patent Office 3,428,953
Patented Feb. 18, 1969

3,428,953
CARD CAPACITOR STORAGE SELECTION SYSTEM

Duane W. Baxter, Rochester, Minn., Bruce C. Felton, Saugerties, N.Y., Harold W. Hill, Takoma Park, Md., and Harry S. Hoffman, Jr., Saugerties, N.Y., assignors to International Business Machines Corporation, Armonk, N.Y., a corporation of New York Filed July 14, 1965, Ser. No. 471,849
U.S. Cl. 340—173 12 Claims
Int. Cl. G11b 9/06

The present invention relates to memory devices and more particularly to memory devices utilizing punched cards.

Electronic data processing systems utilizing high speed memories generally employ random access memories of the magnetic core type, such magnetic cores having an inherent threshold and employing coincident current techniques for address selection. The inherent threshold of these elements permits three dimensional selection utilizing partial selection techniques with a nominal amount of selection circuitry. In certain applications, however, such as processing statistical information, tables of values and other information which either remains unchanged or is seldom changed, the information to be stored may be changed infrequently or at relatively long intervals such that a less sophisticated storage system may be feasible. One such system, known as a card capacitor storage, is a read only storage composed essentially of passive elements adapted to mass production techniques and designed to store information that is changed at relatively infrequent intervals, is characterized by a fast read cycle and provides high storage density in a nominal space at relatively low cost. In one known type of semipermanent capacitor read only storage, the storage elements comprise a network of conductors and insulators having sense lines on one side and drive lines on the opposite side suitably insulated from each and a standard 960 hole metallized data card. The information to be stored is punched in the form of holes in the metallized card and the card inserted between two printed circuit boards having drive and sense lines thereon. An example of a card capacitor memory of the above described type is described in an article in the IBM Journal of Research and Development entitled "Card Capacitor—A Semipermanent, Read Only Memory," Vol. 5, No. 1, January 1961.

In the ensuing description, the card capacitor storage facility with which the present invention is associated is described only generally with respect to the instant invention, since the particular physical configuration or packaging of the facility bears only an environmental relationship thereto. A card capacitor storage facility of the type described in the preferred embodiment consists of decks of drive-sense cards having a plurality of conductors arranged on each side in an orthogonal relationship, each card having 12 drive lines and 80 sense lines suitably insulated from each other and so arranged or stacked that the crossings or intersections between orthogonal pairs of conductors correspond to the 960 possible hole positions in the conventional data card. In the preferred embodiment herein described, a total of 24 such decks, each deck consisting of 16 drive-sense cards and associated data cards, are employed. The information to be stored is punched by standard punch card equipment in the form of holes in the metallized data cards inserted between drive-sense cards. At the intersection of any drive and sense line, no capacitance will exist if a hole in the data card is present, while a capacitance will be exhibited in the absence of a hole at the intersection. The sensing of a signal passed from the drive line to the sense lines is the basic principle of operation of a card capacitor storage. A maximum storage capacity of twelve 80 bit words or eighty 12 bit words, depending upon an arbitrary designation of the row or column as the word, or any other combination of storage up to 960 bits may be provided. In the preferred embodiment, twenty-five bit words are employed so that each data card has storage capability of three words and utilizes 75 of the available 80 sense lines. Each data card is inserted adjacent to an associated sense-drive card of the type defined above to effect drive-sense coupling. A multidimension card selection system is employed in the present invention to effect selection of information on the basis of deck, card and row. Drive select signals are applied to selected conductors corresponding to the word to be read out. The absence of a punch in the associated data card completes the capacitive path and designates a binary ONE; a punch in the data card severs the capacitive drive-sense coupling and designates a binary ZERO. Where there is no hole in the card, the binary ONE condition, this drive pulse will be coupled by capacitive means to an associated orthogonal sense line and detected by the magnitude of the voltage appearing on the sense line during readout; where a hole in the card exists, the binary ZERO condition, the normal coupling between the drive line and the corresponding sense line is destroyed and no output is provided.

One of the problems associated with a card capacitor storage system of the foregoing type is that of drive gating selection using a nominal amount of circuitry and low signal levels. Since the capacitor is a linear element with no inherent threshold, partial selection techniques such as the three-dimension coincident current systems assocated with magnetic core memories are ruled out. Another problem normally associated with card capacitor storage is that of distinguishing between noise and readout signal coupling through the storage due to the low signal-noise ratio. Using conventional two-dimensional selection techniques for a card capacitor memory of the type described above, the number of drives and sense amplifiers required would be prohibitively high, since each line and row of each card would require an associated driver.

In accordance with the present invention, a three-dimensional coincident selection technique is provided for a card capacity storage, while a fourth dimension of selection is introduced by multiplexing a plurality of sense lines into sense amplifiers to effect an economy in drive-sense circuitry. Unilateral conducting devices connected between non-selected sense lines and the sensing devices are reverse biased for the purpose of reducing noise signals, thereby improving the signal to noise ratio of the selected vertical lines.

In the preferred embodiment of the instant invention, double sided drive-sense cards having a grounded center plane are employed. Since data cards will be on either side of the drive-sense card, data cards are fabricated by printing an identical silver ink pattern on both card surfaces which serve to complete the capacitive coupling between drive and sense lines. The selection matrix of the instant invention is a three-dimensional matrix wherein selection after conventional decoding is provided on the basis of the deck, card, and word or row. Initial selection is afforded by three-dimensional decoding circuitry, wherein row and deck drivers are logically combined into row-deck drivers to drive a specified row in all cards of a specified deck. A third level of selection is provided by card drives interconnected to drive a specified one of the sixteen cards in all decks. A fourth level of selection is effected or simulated by gating one of six possible 25 bit outputs in preamplifier circuitry associated with amplifiers. In operation, the selected row in a selected deck is driven by row-deck drivers, which cause the capacitors in the selected row and deck to be charged above a specified reference potential. A plane or card is then selected by activating the appropriate card driver and the potential of the previously charged capacitors in the selected plane is lowered by pulling down the potential of the card driver. A transistor or capacitor discharge will occur only at the previously selected row in the selected card and this detection is coupled through a transformer matrix to a number of sense amplifiers corresponding to the size of the word employed. As a final step in the read cycle, the previously driven and unselected lines must be discharged before another read cycle can begin. This is accomplished by selecting all the card drivers as a final step in the read cycle, thus all capacitors are discharged to ground potential and the array is ready for another read cycle as discussed above.

Accordingly, a primary object of the present invention is to provide an improved selection system for a read only storage.

Another object of the present invention is to provide an improved selection system for a card capacitor read only storage.

A further object of the present invention is to provide a coincident current selection system for a card capacitor storage.

Another object of the present invention is to provide coincident selection techniques for a card capacitor storage system involving row, deck and card selection.

Still another object of the present invention is to provide a coincident selection technique for a card capacitor storage in which capacitors are charged by two levels of selection and discharged by the third level of selection.

The foregoing and other objects, features and advantages of the invention will be apparent from the following more particular description of a preferred embodiment of the invention as illustrated in the accompanying drawings.

Figure 1:
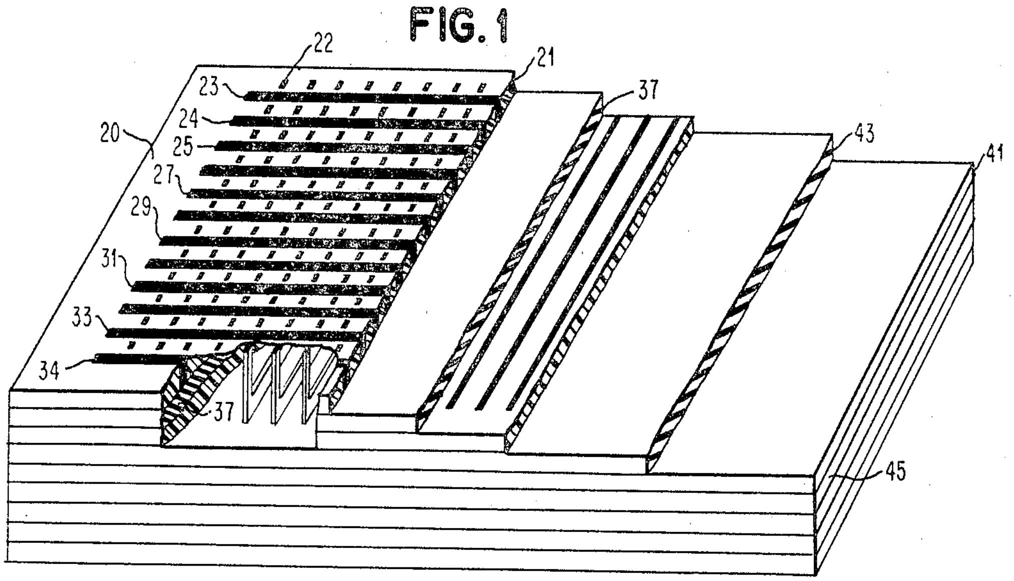
FIGURE 1 illustrates a drive-sense card constructed in accordance with the present invention.

Referring now to the drawings and more particularly to FIGURE 1 thereof, there is illustrated the physical construction of the drive-sense cards employed in the subject invention. A double-sided printed circuit card separated by an intermediate shield is employed in the preferred embodiment, wherein each physical drive-sense card includes two logical drive-sense systems to facilitate packaging. It will be appreciated that separate drive-sense cards could be similarly employed and the present invention will be generally described with reference to single drive-sense and data cards in the interest of simplicity.

Basically, the drive-sense card comprises a passive network in the form of a phenolic card 20 having alternate layers of conductors and insulators with a center plate connected to ground potential. As well known in the art, such cards are susceptible to fabrication at nominal cost using mass production techniques. The phenolic card 20 is broken away in FIG. 1 and the thickness greatly exaggerated to clarify details of fabrication thereof. On the outer layer 21 of each card are twelve drive lines 23–34 disposed in position corresponding to the twelve rows of the conventional data card. A number of orthogonal sense lines having different horizontal levels as illustrated are suitably insulated from the drive lines by a layer of insulation 37. The orthogonal sense lines run along two different horizontal planes, rising to the drive line plane between the drive lines to facilitate capacitive drive-sense coupling. While not shown in the interest of clarity, it will be understood that both drive and sense lines are suitably insulated from the surface of the card by a thin layer of insulation. A total of 80 such lines in each drive-sense card, each sense line having 12 surface segments, are positioned corresponding to the 80 column configuration of a conventional data card. A metallic shield 41 operated at ground potential separates the two physical halves of the drive-sense card with layers of insulation 43, 45 positioned on both sides thereof. The lower portion of the drive-sense card below the grounded shield 21 is identical in construction to the upper portion heretofore described.

Figure 2:
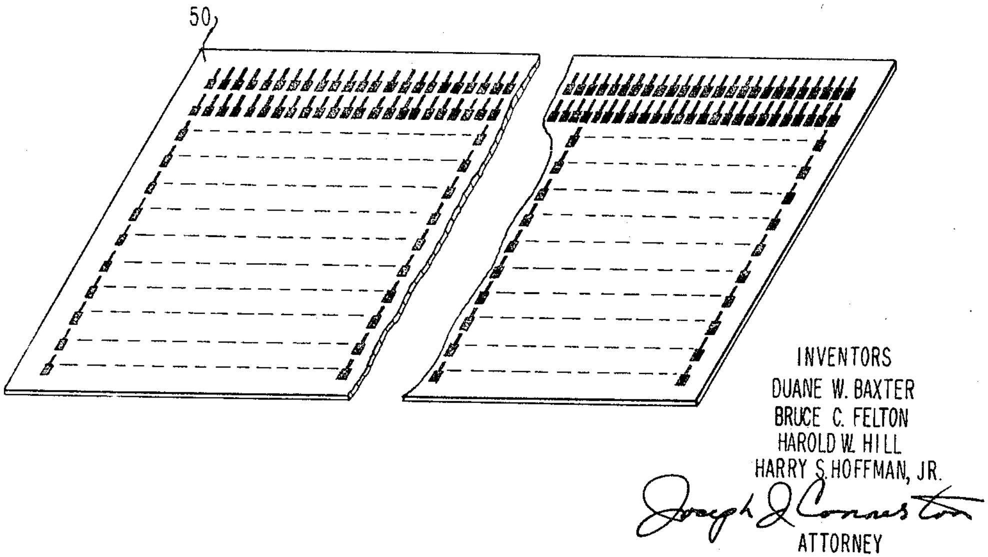
FIGURE 2 illustrates a data card constructed in accordance with the present invention.

Referring now to FIGURE 2, there is illustrated in plane view the data card employed in the present invention. Since the data card may be driven from either side in accordance with its relative position in the matrix, an identical circuit pattern is imprinted on both sides of the card. The data card with respect to physical dimensions and storage capacity corresponds to the conventional IBM data card having twelve rows of 80 columns thereon. The particular silver conductive pattern employed in the preferred embodiment herein described is designed to provide an overlap between the drive and sense lines on those portions of the drive-sense card where the sense indicia rises to the surface. The data card is shown inverted from its normal horizontal position relative to the drive-sense card, since in operation the leg of the T overlaps the surface portions of the drive line while the bar of the T overlaps the sense line, the punch severing the leg portion of the T. While a specific conductive pattern has been shown and described in the preferred embodiment, it will be appreciated that other patterns including the disclosed pattern rotated 90° could be employed. As described in greater detail hereinafter, the capacitive drive-sense coupling corresponds schematically to two capacitors in series, the data and sense lines representing one plate of each capacitor, the silver ink pattern on the data card representing the other plate of each capacitor. Punching the data card severs the leg of the T, thus effectively opening the line between capacitors. Both the drive-sense and data cards have been described only generally, since details of the cards per se are only considered necessary to an understanding of the capacitor card storage. While not illustrated, the data cards could be suitably notched in accordance with conventional practice to facilitate correct positioning of the cards within the deck.

Figure 3:
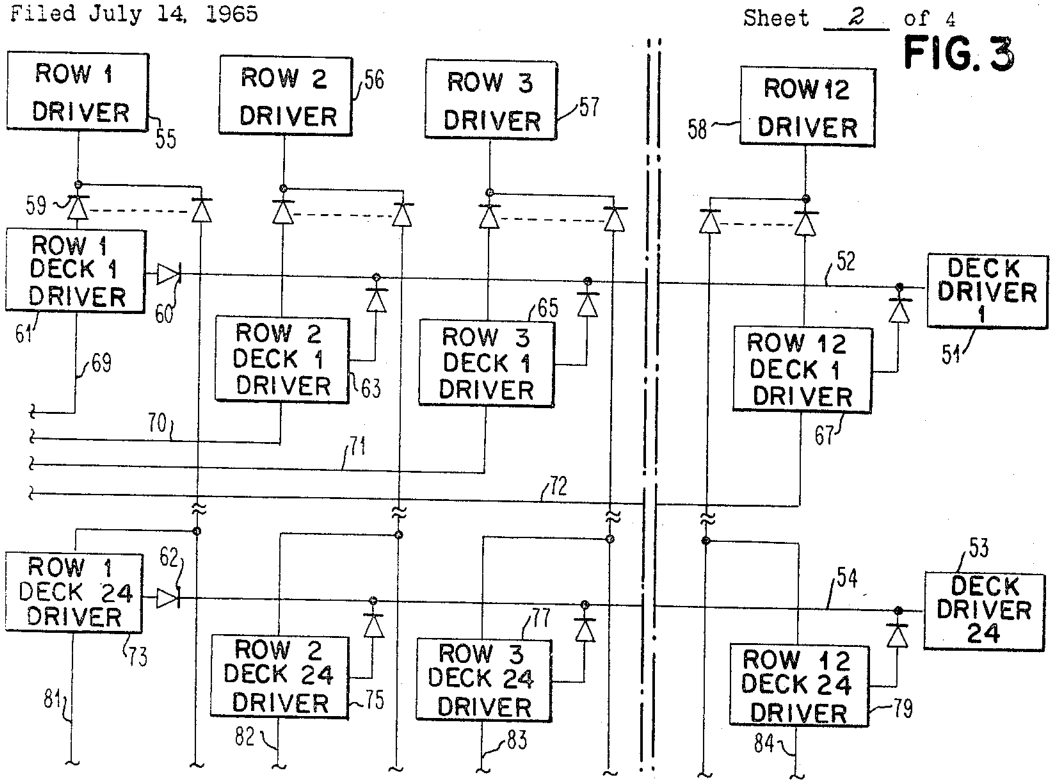
FIGURE 3 illustrates in block schematic form the row-deck selection system utilized in the instant invention.

Referring now to FIGURE 3, there is illustrated in block schematic form portions of the drive selection circuitry utilized in the present invention. The first and foremost purpose of the selection circuitry is to select and read out binary information from a specific address in the card capacitor storage such that each unique selection shall cause the selected word to be read out of memory. In the instant invention, this involves selecting a particular row in a particular card in a particular deck to cause read out of 150 bits, 75 bits from each card, and selecting 25 bits as the desired word. The first two levels of selection are provided with respect to deck and row in the following manner. In the ensuing description, only two of the 24 deck drivers and four of the 12 row drivers will be shown and described, the remaining drivers being identical in structure and operation to those described.

Since provision must be made for driving each row in each deck, direct driving techniques would require a total of 192 ($12\times16$) row drivers per deck, or an overall total of 4608 ($192\times24$) row drivers. These in turn would be combined with the output from 24 deck drivers for a row-deck selection. Such a selection with provisions to prevent undesired cross-coupling or readout of non-selected lines would require a substantial amount of circuitry which would offset to some degree the advantages of the card capacity storage system. To reduce the amount of circuitry involved, 12 row drivers are logically combined with 24 deck drivers to provide a combined row deck selection with 288 row-deck drivers. The initial description of the row deck selection is shown only in block form, while the specific circuitry will be shown in schematic form described hereinafter. Deck drivers 51 and 53, representative of decks 1 and 24, provide an output on lines 52, 54 respectively which is applied through associated diodes, to a series of row deck drivers, where it is logically combined with the output from associated row drivers 55–58 representative of rows 1, 2, 3 and 12. One output from each row driver is connected through an associated diode for each deck, to a row deck driver so that each row driver requires 24 outputs. Likewise, each deck driver is connected through a diode to an associated row-deck driver such that each deck driver has 12 outputs. Row deck drivers 61, 63, 65 and 67 combine the output from deck 1, driver 51 with the output from row drivers 1, 2, 3 and 12 to provide row-deck outputs for deck 1 on lines 69–72 respectively. In like manner, the output from deck 24, driver 53 is logically combined with the output from the same row drivers in row-deck drivers 73, 75, 77 and 79 to provide row deck outputs on lines 81, 82, 83 and 84 respectively. Thus, as previously described, a total of 288 row deck drivers will provide row deck selection for each of 12 rows in each of 24 decks.

The third level of selection employed is the individual card within each deck. This selection is provided by utilizing 16 card drivers, since there are 16 cards within each deck, and each card driver drives 12 rows of its associated card in all decks. For example, card 1 driver drives all 12 rows of card 1 in each of 24 decks, card 2 driver drives 12 rows of card 2 in each of 24 decks, etc. Card 1 driver 87 and card 16 driver 89 are shown in block form in FIGURE 4 and described relative thereto. In operation, the row-deck driver is selected by conventional decoding circuitry, not shown, and the positive output from the selected row deck driver charges those capacitors in the specified row of the specified deck which contain a binary ONE, i.e., where no punch is present. A specific card is selected through conventional decoding techniques, and the potential on the card dropped by applying a negative signal from the specified card driver to all 12 rows of the specified card in each of the 24 decks. The charged capacitors in the selected row discharge, providing a total of 150 outputs to word select circuitry more fully described hereinafter, whereby a word of 25 bits is selected and applied to 25 sense amplifiers.

Figure 4:
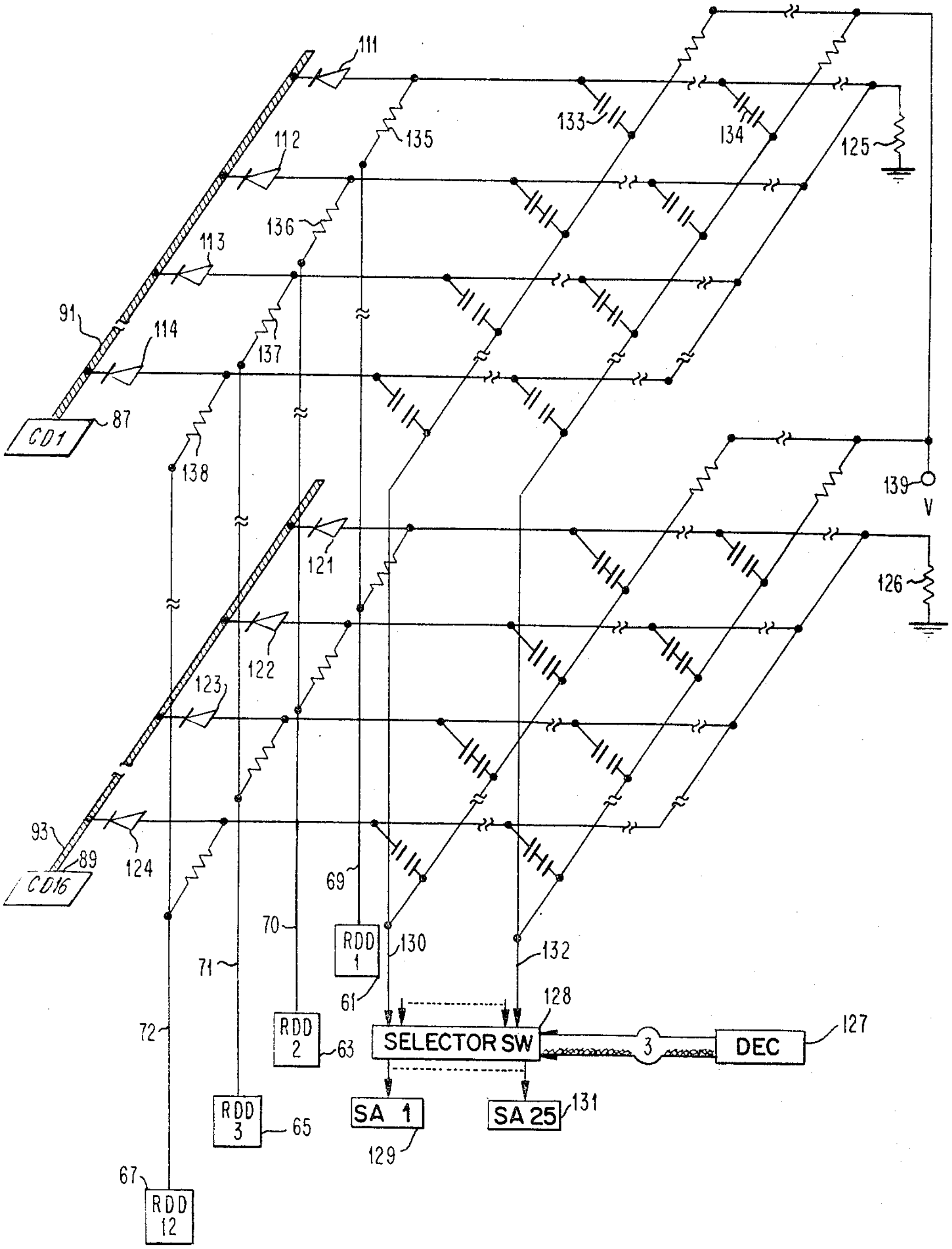
FIGURE 4 illustrates in schematic form a three-dimensional view of a single deck constructed in accordance with the present invention.

A representation of the overall system utilizing two planes or cards of one deck is shown in block schematic form in FIGURE 4 in which the binary ONE condition is represented by two interconnected capacitors, and the binary ZERO condition represented by a severed link between two capacitors. As previously described, each deck is composed of 16 cards, each of which is connected to an associated card driver, two of which 87, 89 are shown in block form in FIGURE 4. Card 1 driver 87 is connected through line 91 to each of the 12 word lines in its associated card by bus 91 and diodes 111, 112, 113 and 114 respectively representative of words or rows 1, 2, 3 and 12. Card 16 driver 89 is connected through bus 93 and a corresponding set of diodes 121, 122, 123 and 124 to each of the corresponding word lines of the 16th card in each deck. Each of the word lines in each card is terminated through a resistor 125, 126 to a source of ground potential to complete the card driver circuits for cards 1–16. A single set of 16 card drivers suffices for all 24 decks, and the output of each card driver in turn is connected in parallel through a set of 12 diodes to the corresponding cards in each of the 24 decks.

Each deck is provided with 12 row-deck drivers, four of which (61, 63, 65, 67) are shown in the drawing for rows 1, 2, 3 and 12 respectively. A row deck driver is a circuit which drives one row of all cards in a specified deck. Row-deck diver 61 is connected to the first row of each card in deck 1, but only to that deck, row-deck driver 63 to the second row in each card in the deck, and row-deck drivers 65 and 67 to the third and 12th rows in each card in the deck. When operated in the manner heretofore described, the output from the deck, shown as lines 130 and 132 is in the form of 150 sense lines (75 per side of card), are connected to selector switch 128. Decoder 127 conditions selector switch 128 to provide a one in six selection of one 25 bit word which is applied to twenty-five sense amplifiers, two of which 129, 131 are shown as the sense amplifiers for line 1 and 25 respectively.

Sense lines of each of the 16 cards in the deck are connected in series and the 16 similar lines, one in each of the succeeding cards of the decks, are connected in parallel to the input of selector switch 128. Each of the successive 150 sense lines 130 through 132 are similarly connected to the selector switch 128. Selector switch 128 is under the control of a decoder selected circuit 127, which responds to a coded 3 bit signal to provide a one in six selection in consecutive groups of 25 bits, i.e., one of the six groups of consecutive sense lines 1–25, 26–50, etc. the selected group of which is then applied to 25 sense amplifiers.

Operation of the configuration shown in FIGURE 4 is as follows. A particular word line in a particular deck is selected by first selecting the row-deck driver which corresponds to the row and deck of the selected word. A positive potential is applied from the row-deck driver, charging those capacitors in the specified row and deck identifying a binary ONE. In the illustrated embodiment of FIGURE 4, a binary ONE is designated schematically as two interconnected capacitors in series, while a binary ZERO is identified by two capacitors in which the interconnection has been severed by a punch, the binary ONE and ZERO condition being randomly distributed. For example, in row one of card one, capacitors 133 interconnected to sense line 131 are open designating a binary ZERO condition, while capacitors 134 interconnected to sense line 132 identify a binary ONE condition. When the positive signal is applied from the row-deck driver, those capacitors in the selected row and deck are charged. A negative signal is then generated by the selected card driver and applied to all rows of the selected card, pulling the potential on all rows of that card down and discharging only the capacitors in the selected word, the resultant discharge being detected by the appropriate sense amplifiers 129–131. Thus when the appropriate card driver is selected, only those capacitors on the selected line will be discharged. This discharge will produce outputs on 150 sense lines, which will be applied to the selector switch 128, and through an appropriate decoder selection circuit more fully described hereinafter, the selected 25 sense lines are coupled to sense amplifiers 129, 131 to provide a readout of the selected word. In the illustrated arrangement of FIGURE 4, resistors 135–138 in card 1 and corresponding resistors in each of the cards are used to ensure that card drivers do not go more negative than −1 volt. It also ensures that diodes such as 111–114, which would be tied to ground, are tied to the output of their associated card driver, in the case of card 1, card driver 87. Terminal 139 is connected to a source of reference voltage, the level of which will depend on the specific sense amplifier employed.

The last level of selection is provided by a transformer matrix and appropriate selection circuitry whereby one of six groups of transformers in the pre-amplifier circuitry is selected. Such selection is required since a total of 150 sense lines representing the output from a double drive sense card would be actuated by the foregoing described technique, but only one 25 bit word is selected. Details of the sensing circuitry and the one out of six selection are shown and described in detail relative to FIGURE 6.

Figure 5:
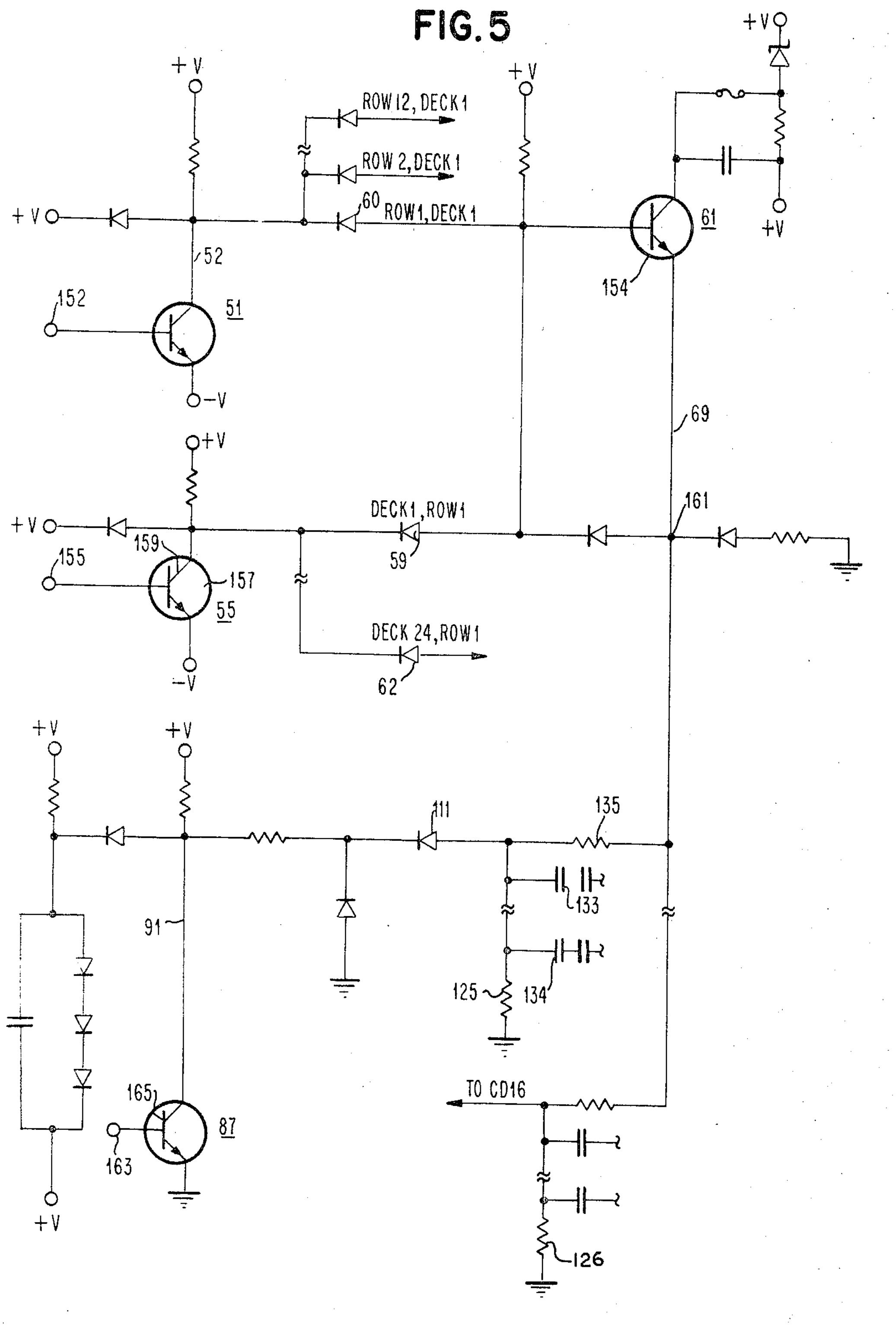
FIGURE 5 illustrates in schematic form details of the selection system shown in block schematic form in FIGURE 4.

Referring now to FIGURE 5, there is illustrated in schematic form details of the drive-sense selection circuitry shown in block form in FIGURE 4. The drawing illustrates the selection related to row 1 of card 1, of deck 1 wherein components or circuits corresponding to those shown in FIGURES 3 and 4 are identified by similar subscripts. As described previously, the capacitors in the selected word of the card capacitor storage are charged by a row-deck selection and discharged by a card selection, the resulting discharge being detected as a readout signal by the sensing circuitry. Because of the relatively heavy load driven by the selection circuitry, drivers are employed for deck, row and card selection. For example, each row driver has 16 outputs, each deck driver 12 outputs and each card driver 24 outputs as heretofore described. The row-deck driver 61 is a driver actuated by a row and a deck input to provide the drive signal which charges the capacitors in the selected row of the selected deck. As shown in FIGURE 5, row-deck driver 61 comprises a transistor 154 having a signal from deck driver 51 applied through diode 60 to its base and a signal from row driver 55 applied through diode 59 to its emitter. Deck driver 51 basically comprises an inverter circuit which responds to an input on terminal 152 from the row selection circuitry to provide a positive output on line 52 which is applied through diode 60 to the base of transistor 154. Simultaneously, a signal from the deck selection circuitry is applied through input terminal 155 to the base of transistor 157 turning transistor 157 OFF, thereby providing a negative signal at terminal 161, causing transistor 154 in the row-deck driver circuitry to conduct. The resulting positive output from transistor 154 is applied via line 69 and resistor 135 to charge those capacitors associated with row 1 of each card in deck 1. While the driver associated with the selected row is turned OFF, the drivers associated with the remaining 11 non-selected rows are turned ON.

Referring back to FIGURE 4, capacitors 133 and 134 have been shown as associated with the row-deck selection circuitry of card 1, row 1 and are likewise shown in the FIGURE 5 configuration. It will be appreciated that at this point all capacitors identified with the selected row and deck are fully charged. In the previous description, it was indicated that readout is provided by pulling down the potential of the selected card, causing the capacitors to discharge, and simultaneously sensing the output from the selected sense lines. Since the noise problem generally rises during capacitor charging, and since the instant invention operates by reading out during capacitor discharge, it will be understood that the noise problem is obviated.

In response to a positive signal from card selection circuitry applied through terminal 163 to the base 165 of card driver 87, the resultant negative output on bus 91 will be applied through their respective diodes to all rows of the selected card in the manner shown and described relative to FIGURE 4. However, since only those capacitors in the selected row of the specified card will be discharged, the only readout which will occur resulting from the capacitor discharge will be that associated with the selected word. The positive signal applied to the base 165 of card 1 driver 87 causes those capacitors associated with row 1 of deck one to discharge through resistor 125 to ground. This discharge, if sensed by the associated sense lines in the manner shown in FIGURE 4 will cause 25 of these sense outputs to be selected in the manner described hereinafter with reference to FIGURE 6. The read cycle is finished by selecting and applying a negative signal to all card drivers to insure that all capacitors including the selected card are discharged. A fourth level of selection is provided by conditioning the appropriate transformers in the transformer matrix in the manner described below with reference to FIGURE 6.

Figure 6:
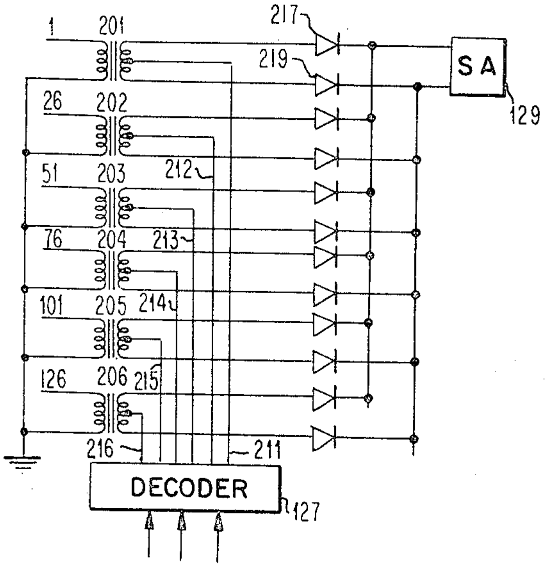
FIGURE 6 illustrates in schematic form the transformer sense selection system utilized in the instant invention.

Referring now to FIGURE 6, there is illustrated in schematic form a portion of the selection circuitry shown as block 128 in FIGURE 4. To simplify the ensuing description; the selection of a single sense winding from a group of six will be shown, since the remainder of the selection of the circuitry merely duplicates the single bit selection. As shown in FIGURE 4, the initial one of six selections is made by a conventional 3 bit decoder 127, which generates a positive potential for the selected output, six of which are employed and interconnected as shown in FIGURE 6. The transformer selection matrix is wired in groups of 6, one of each group representing the corresponding bit in the six 25 bit words. Referring to the drawing, transformers 201–206, indicative of the first bit of each group of 25 lines, are connected to the output of sense lines 1, 26, 51, 76, 101 and 126 respectively. Each of the remaining 144 outputs will be similarly connected to a corresponding six transformer matrix. For example, the sense outputs for bits 2, 27, 52, 77, 102 and 127 would be wired to an identical transformer matrix, while the sense outputs for words 25, 50, 75, 100 and 125 and 150 would comprise the six transformer matrix which would be connected to sense amplifier 131 (FIG. 4). The second input terminals of the primary windings of the six transformers would be tied together to a source of reference potential as shown. The secondaries of the transformers 201–206 have an associated pair of diodes connected to each side thereof which are normally backed biased by the decoder output of the non-selected lines applied to the center tap of the windings. The outputs 211–216 of the decoder 127, comprising six of the available eight outputs from the decoder, are connected to the center taps of a secondary winding of transformers 201–206 respectively. Assuming that it is desired to read out word one comprising bits 1–25, transformer 201 will be selected and a positive potential applied from decoder 127 through conductor 211 to the center tap thereof. This positive potential forward biases the associated diodes 217 and 219 so that the signals appearing on the primary of transformer 201 from the selected line 1 sense winding will be coupled through the transformer and diodes to sense amplifier 129. The remaining of the non-selected transformer secondary windings will have a negative signal applied to their center taps from the non-selected decoder outputs, back biasing the associated pairs of diodes, the resulting high impedance preventing any signals coupled through the transformers from reaching the sense amplifier 129. The transformer matrix employed for selection in the subject invention will include 150 transformers, 25 identical transformer matrices, each of which will be connected to the output from decoder 127 in an identical manner to that shown in FIGURE 6. Each six transformer matrices will have an associated sense amplifier so that a total of 25 such sense amplifiers permits readout from 150 sense windings comprising the sense lines on both sides of the drive-sense card heretofore described. The selection of decoder 127 is prior to actuating the selected card driver such that the matrix is ready for readout at the time the capacitors comprising the selected word are discharged. Since the sense amplifier constitutes a relatively expensive component compared to a transformer, the selection system herein employed wherein selection is provided through a transformer configuration in the preamplifier portion of the sense circuitry permits an economical readout arrangement although it will be appreciated that each sense winding could have an associated sense amplifier. The decoder used in selection and sense amplifiers such as 109 are not illustrated or described in detail since many suitable circuits of this type are well known in the art. It is seen therefore that novel card capacitor storage selection systems may be employed which utilize coincident selection techniques for read-only operations. The size of the memory may be varied, and the information readily modified by changing data cards. The number of drivers utilized for selection is minimized, thereby reducing the cost of manufacture. The low signal levels employed make the card capacitor storage a low loss reactance device, with minimum power dissipation.

While the invention has been particularly shown and described with reference to a preferred embodiment thereof, it will be understood by those skilled in the art that various changes in form and details may be made therein without departing from the spirit and scope of the invention.

What is claimed is:

1. A card capacitor storage including a plurality of cards disposed in a predetermined spatial configuration,
said cards containing a plurality of spaced intersecting drive and sense lines,
a plurality of capacitors for providing selective coupling between said drive and sense lines at predetermined intersections thereof,
means for selectively charging a first group including a plurality of sub-groups of said capacitors,
and means for selectively discharging a second group of said capacitors,
said second group including one predetermined sub-group of said first group whereby an output is derived in those sense lines coupled by the predetermined sub-groups to the drive lines.

2. A device of the character claimed in claim 1 wherein said means for selectively charging said first group of said capacitors is responsive to two dimensions of selection.

3. A device of the character claimed in claim 2 wherein said means for discharging said second group of said capacitors is responsive to a third dimension of selection.

4. A selection system associated with a card capacitor storage comprising in combination
a plurality of cards arrayed in a predetermined spatial configuration,
said cards containing a plurality of intersecting drive and sense lines,
a plurality of capacitors arranged in groups and sub-groups for providing selective capacitive coupling between said drive and sense lines at predetermined intersections thereof,
means responsive to a first and second dimension of selection for charging a first group of said capacitors,
means responsive to the third dimension of selection for selectively discharging a second group of said capacitors,
said second group including a sub-group common to said first group whereby the information in said common sub-group is sensed by said sense lines.

5. A selection system associated with a card capacitor storage comprising in combination
a plurality of cards arrayed in parallel planes,
said array including a plurality of vertical and horizontal planes,
each of said cards including spaced intersecting drive and sense lines disposed thereon,
means for providing selective coupling between intersecting drive and sense lines,
said means comprising a plurality of groups and associated sub-groups of capacitors connected to said array,
means for charging the capacitors associated with a first of said planes,
means for selectively discharging said capacitors in a second of said planes,
said capacitors in said second plane being common to said first plane, and
means for sensing the indicia representing signals provided by said capacitor discharge.

6. A device of the character claimed in claim 5 wherein said means for charging the capacitors associated with a first of said planes is responsive to two dimensions of selection.

7. A device of the character claimed in claim 6 wherein said means for selectively discharging said capacitors in said second plane is responsive to a third level of selection.

8. A three dimension selection system for a card capacitor memory comprising in combination
a plurality of drive-sense cards stacked in a three-dimensional array,
said drive-sense cards having spaced intersecting drive and sense lines thereon,
means comprising groups and sub-groups of capacitors for selectively coupling said drive and sense lines,
first selection means responsive to two dimensions of selection for charging one of said groups of capacitors,
second selection means responsive to a third level of selection for discharging a second of said groups of capacitors,
said second of said groups of capacitors including a sub-group common to said first group,
and means for sensing the discharge of said common sub-group to provide an output indicative of the binary information stored therein.

9. A device of the character claimed in claim 8 wherein said means for selectively coupling said drive and sense lines comprises a plurality of data cards having data manifesting perforations therein,
said data cards having a metallic pattern imprinted thereon to complete the capacitive coupling between said drive and sense lines.

10. A device of the character claimed in claim 9 wherein said perforations sever the capacitive couplings and designate the binary ZERO condition and,
wherein the absence of said perforations designates the binary ONE condition.

11. A three dimensional selection system for a card capacitor memory comprising in combination
a plurality of cards disposed in groups of decks, each of said decks comprising a plurality of stacked cards,
each of said cards having spaced intersecting drive and sense lines thereon,
means for selectively providing capacitive coupling between said drive and sense lines at the intersections thereof,
said means comprising a metallized data card having data manifesting perforations therein, the pattern of said data card forming a plurality of coupling capacitors at the said selected intersections,
means for selectively reading a word from said memory means,
said means being responsive to decoded address signals representative of a selected deck and row to charge capacitors associated with the selected row and deck,
means responsive to decoded address signals representative of the card address to discharge those charged capacitors in the selected card,
a plurality of sense amplifiers, and
means for coupling the resulting signals to said sense amplifiers to represent the information stored in said address.

12. A device of the character claimed in claim 11 wherein a fourth level of selection is effected in said selection by utilizing an output matrix and associated selection network in the preamplifier stage of said sense amplifiers.

References Cited

UNITED STATES PATENTS

| | | | |
|---|---|---|---|
| 3,187,309 | 6/1965 | Dopp et al. | 340—173 |
| 3,192,510 | 6/1965 | Flaherty | 340—166 X |
| 3,214,740 | 10/1965 | Booth | 340—174 |
| 3,355,722 | 11/1967 | Grubb et al. | 340—173 |

STANLEY M. VRYNOWICZ, Jr., *Primary Examiner.*

J. F. BREIMAYER, *Assistant Examiner.*

U.S. Cl. X.R.

340—166, 174